(12) United States Patent
Chiam et al.

(10) Patent No.: US 11,640,671 B2
(45) Date of Patent: May 2, 2023

(54) MONITORING SYSTEM AND METHOD FOR IDENTIFYING AN OBJECT OF INTEREST AFTER THE OBJECT OF INTEREST HAS UNDERGONE A CHANGE IN APPEARANCE

(71) Applicant: MOTOROLA SOLUTIONS, INC., Chicago, IL (US)

(72) Inventors: Heng Cheng Chiam, Penang (MY); Zhe Heng Lee, Negeri Sembilan (MY); Uvarajan Moorthy, Kedah (MY); Chun Seng Song, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 143 days.

(21) Appl. No.: 17/196,542

(22) Filed: Mar. 9, 2021

(65) Prior Publication Data
US 2022/0292695 A1    Sep. 15, 2022

(51) Int. Cl.
*G06T 7/292* (2017.01)
*G06F 16/50* (2019.01)
(Continued)

(52) U.S. Cl.
CPC .............. *G06T 7/292* (2017.01); *G06F 16/50* (2019.01); *G06K 9/6201* (2013.01);
(Continued)

(58) Field of Classification Search
CPC .......... G06T 7/292; G06T 2207/30232; G06K 9/6201; G06V 10/751
See application file for complete search history.

(56) References Cited

U.S. PATENT DOCUMENTS 9,471,849 B2    10/2016  Gurwicz et al.
2010/0157062 A1  6/2010  Baba et al.
(Continued)

FOREIGN PATENT DOCUMENTS

CN    111061825 B    12/2020
GB    2542884 A      4/2017
(Continued)

OTHER PUBLICATIONS

International Search Report and Written Opinion for Application No. PCT/US2022/070868 dated Jun. 3, 2022 (14 pages).

*Primary Examiner* — Myron Wyche
(74) *Attorney, Agent, or Firm* — Michael Best & Friedrich LLP

(57) ABSTRACT

Monitoring system and method for identifying object of interest after the object of interest has undergone a change in appearance. The method includes detecting an appearance of a first object of interest in a first zone and determining whether the first object of interest has appeared in a second zone adjacent the first zone within a predetermined time. When the first object of interest has not appeared in the second zone within the predetermined time, the method includes adding the first object of interest to a disappearance database and detecting an unexplained appearance of a second object of interest in a third zone of the plurality of zones. When an unexplained appearance of the second object of interest is detected, the method includes adding the second object of interest to a suspect database, and generating a notification for a first responder regarding the second object of interest.

14 Claims, 4 Drawing Sheets

(51) Int. Cl.
*G06K 9/62* (2022.01)
*G08B 25/00* (2006.01)

(52) U.S. Cl.
CPC ......... *G06K 9/6261* (2013.01); *G08B 25/006* (2013.01); *G06T 2207/10016* (2013.01); *G06T 2207/30196* (2013.01); *G06T 2207/30232* (2013.01)

(56) References Cited

U.S. PATENT DOCUMENTS

| | | | |
|---|---|---|---|
| 2013/0065607 A1* | 3/2013 | Soulie | G08G 1/0133 455/456.1 |
| 2016/0307420 A1* | 10/2016 | DeLean | G06V 10/751 |
| 2018/0011463 A1 | 1/2018 | Chowdhury | |
| 2018/0144481 A1 | 5/2018 | Shibata et al. | |
| 2020/0151441 A1 | 5/2020 | Doumbouya et al. | |
| 2020/0221054 A1* | 7/2020 | Carey | G06V 40/23 |

FOREIGN PATENT DOCUMENTS

| | | |
|---|---|---|
| WO | 2015178540 A1 | 11/2015 |
| WO | 2020195376 A1 | 10/2020 |

\* cited by examiner

MONITORING SYSTEM AND METHOD FOR IDENTIFYING AN OBJECT OF INTEREST AFTER THE OBJECT OF INTEREST HAS UNDERGONE A CHANGE IN APPEARANCE

BACKGROUND OF THE INVENTION

Building and facilities management often includes monitoring the facilities using strategically placed video cameras. The video cameras provide live image and/or video feeds to a monitoring system for manual monitoring by security personnel. Security personnel constantly monitor the video feeds to identify objects of interest (including persons of interest) to determine whether an action is needed. Depending on the size of the facility and the number of video cameras providing live feeds, there may not be sufficient manpower to monitor the facility of developing security threats.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
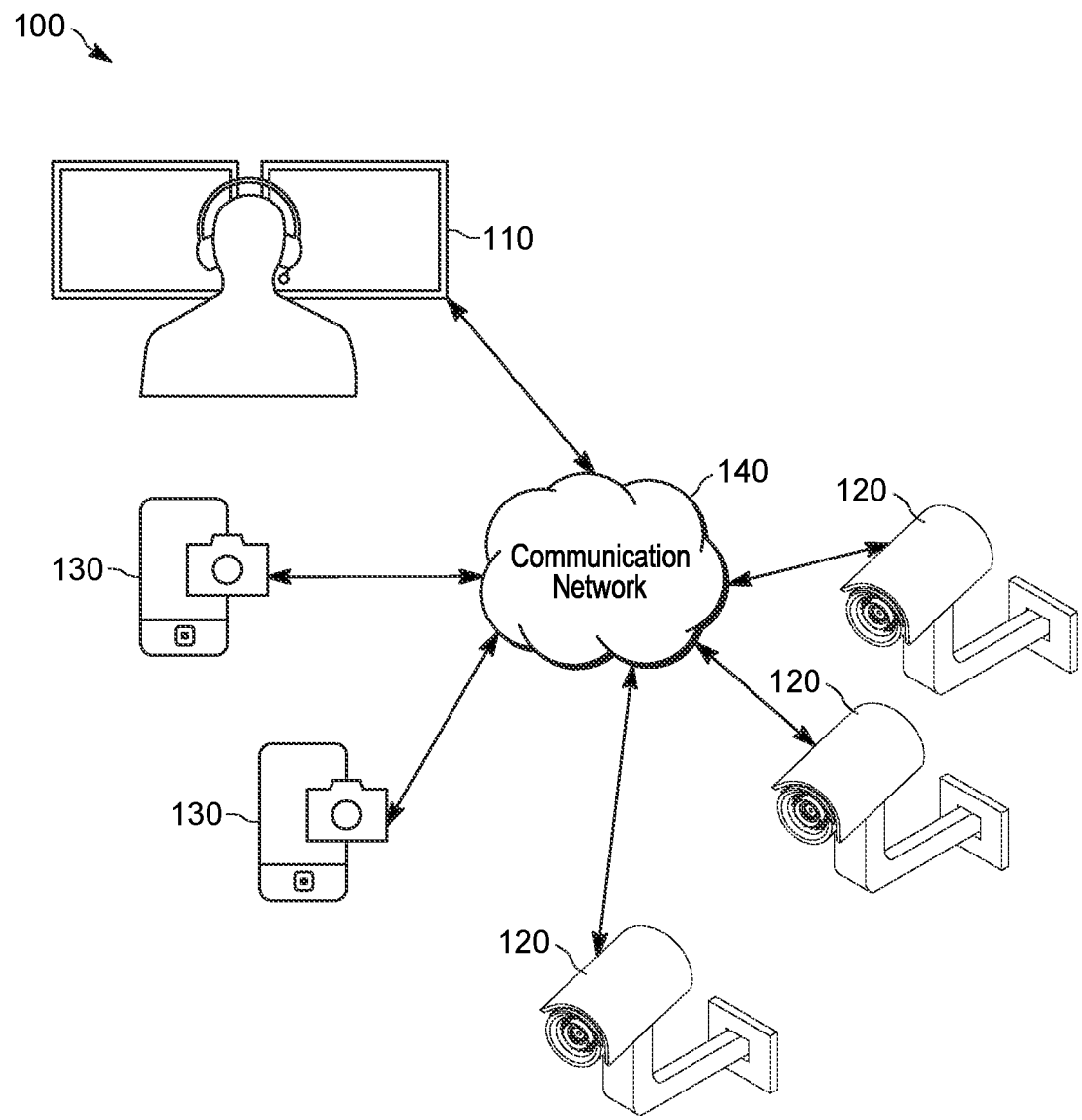
FIG. 1 is a block diagram of a monitoring system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Manual video monitoring is increasingly being replaced by automated live feed monitoring. Automated monitoring systems increase the accuracy of detecting security threats while reducing the manpower needed to monitor facilities. These monitoring systems use image recognition techniques to identify objects of interests in the live feeds and to track the objects of interests across the locations within the facility. The monitoring systems can also track an object of interest through slight changes in appearance. For example, when a person of interest enters a restroom and changes a piece of clothing (for example, removes a winter jack, puts on a hat, and the like), the automated systems can still detect that the person that exited the restroom with a different appearance is the same person that entered the restroom previously.

In some situations, however, the change in appearance may be too drastic for the monitoring system. For example, a person of interest may enter a restroom and put on a face mask completely covering the face along with a full-body costume. In these situations, the monitoring system do not recognize that the person that exited the restroom with a different appearance is the same person that entered the restroom previously.

Accordingly, there is a need for monitoring systems and methods for identifying an objects of interest after the object of interest has undergone a change in appearance.

One embodiment provides a monitoring system for a monitored area including one or more image sensors for tracking objects of interest in the monitored area and an electronic processor coupled to the one or more image sensors. The electronic processor is configured to divide a monitored area into a plurality of zones and detect, using the one or more image sensors, an appearance of a first object of interest in a first zone of the plurality of zones. The electronic processor is also configured to determine whether the first object of interest has appeared in a second zone of the plurality of zones within a predetermined time. The second zone is adjacent the first zone. The electronic processor is further configured to in response to determining that the first object of interest has not appeared in the second zone within the predetermined time, add the first object of interest to a disappearance database and detect, using the one or more image sensors, an appearance of a second object of interest in a third zone of the plurality of zones. The electronic processor is also configured to compare a likeness of the second object of interest to one or more likenesses of one or more objects of interests in the disappearance database. The electronic processor is further configured to in response to determining that the likeness of the second object of interest does not match one of the one or more likenesses of one or more objects of interest in the disappearance database add the second object of interest to a suspect database, and generate a notification for a first responder regarding the second object of interest.

Another embodiment provides a method of identifying an object of interest after the object of interest has undergone a change in appearance. The method includes dividing, using an electronic processor of a monitoring system, a monitored area into a plurality of zones and detecting, using one or more image sensors of the monitoring system, an appearance of a first object of interest in a first zone of the plurality of zones. The method also includes determining, using the electronic processor, whether the first object of interest has appeared in a second zone of the plurality of zones within a predetermined time. The second zone is adjacent the first zone. The method further includes in response to determining that the first object of interest has not appeared in the second zone within the predetermined time, adding the first object of interest to a disappearance database. The method also includes detecting, using one or more image sensors of the monitoring system, an appearance of a second object of interest in a third zone of the plurality of zones and comparing, using the electronic processor, a likeness of the second object of interest to one or more likenesses of one or more objects of interests in the disappearance database. The method also includes in response to determining that the likeness of the second object of interest does not match one of the one or more likenesses of one or more objects of interest in the disappearance database adding, using the electronic processor, the second object of interest to a suspect database, and generating, using the electronic processor, a notification for a first responder regarding the second object of interest.

With reference to FIG. 1, a monitoring system 100 for a monitored area includes a command server 110, a plurality of image sensors 120 (for example, one or more image sensors 120), for tracking objects of interest in the monitored area, and a plurality of portable communications devices 130. The command server 110 communicates with the plurality of image sensors 120 and the plurality of portable communications devices 130 over a communication network 140. The monitoring system 100 may include more or fewer components that those illustrated in FIG. 1 and may perform additional functions other than those described herein. The command server 110 is a computing device implemented in a cloud infrastructure or located at a monitoring facility or other location. The monitoring facility is, for example, a monitoring control room of a facility such as a security room of a shopping mall, a movie theater, an airport, a commercial building, and the like. The plurality of portable communications devices 130 include, for example, two-way portable radios, two-way mobile radios, smart telephones, tablet computers, wearable devices, and the like assigned to first responders of the monitored area. First responders include, for example, police officers, firemen, emergency medical technicians, building or facility security personnel, and the like. The communication network 140 is, for example, a WiFi® network, a cellular network, or the like, or a combination of one or more wired networks and/or one or more wireless networks.

Figure 2:
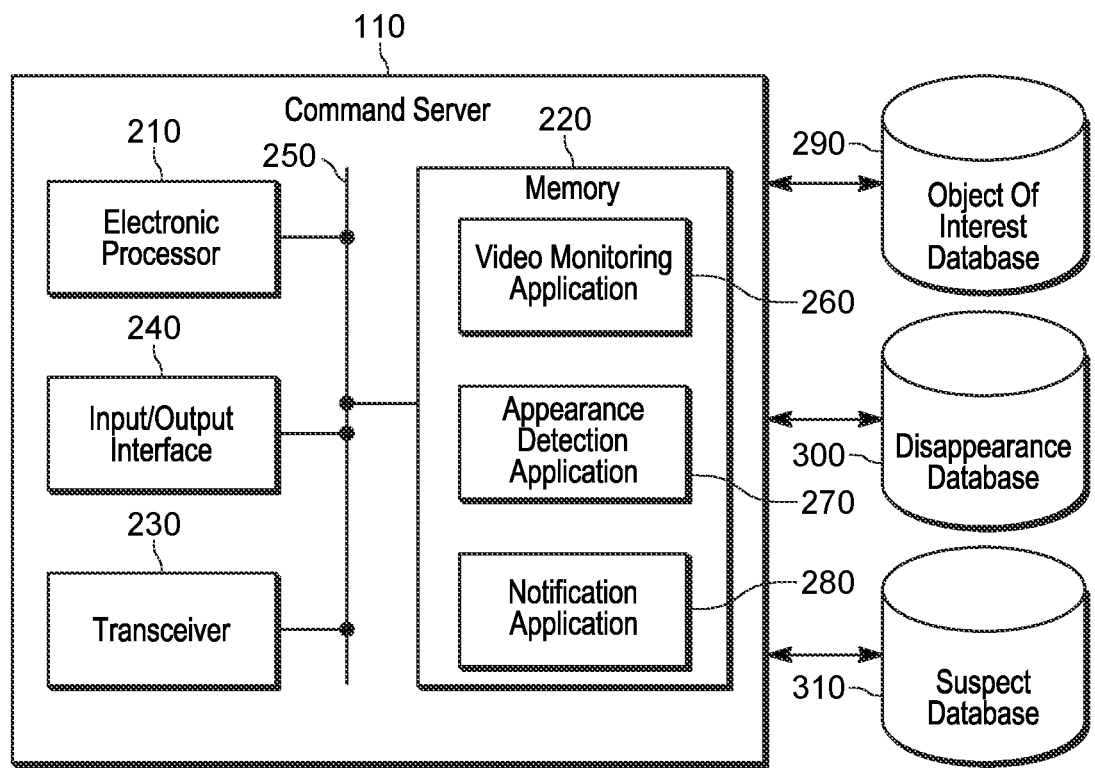
FIG. 2 is a block diagram of a command server of the monitoring system of FIG. 1 in accordance with some embodiments.

FIG. 2 is a block diagram of one embodiment of the command server 110. In the example illustrated, the command server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the command server 110. The command server 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the command server 110 described herein. The memory 220 may include, for example, a program storage area and a data storage area. The program storage area and the data storage area may include combinations of different types of memory, such as read-only memory and random-access memory. In some embodiments, the command server 110 may include one electronic processor 210, and/or a plurality of electronic processors 210 in a cloud computer cluster arrangement, one or more of which may be executing none, all, or a portion of the applications of the command server 110 provided below, sequentially or in parallel across the one or more electronic processors 210. The one or more electronic processors 210 comprising the command server 110 may be geographically co-located or may be separated by inches, meters, kilometers or miles, and interconnected via electronic and/or optical interconnects. One or more proxy servers or load balancing server may control which one or more electronic processors 210 perform any part or all of the applications provided below.

The transceiver 230 enables wired and/or wireless communication of the command server 110 with the plurality of image sensors 120 and the plurality of portable communications devices 130 over the communication network 140. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

The memory 220 stores several applications that are executed by the electronic processor 210. In the example illustrated, the memory 220 includes a video monitoring application 260, an appearance detection application 270, and a notification application 280. The video monitoring application 260 is executed to perform an appearance search to analyze image and/or video files for identifying objects or persons of interest. The objects or persons of interest are identified based on facial recognition or image recognition techniques. The appearance detection application 270 is executed in conjunction with the video monitoring application 260 to identify suspected objects of interest (including persons of interest) as further described with respect to the methods below. The notification application 280 is executed to notify first responders regarding a suspected object of interest.

With reference to FIG. 2, the command server 110 is also in communication with an object of interest database 290, a disappearance database 300, and a suspect database 310. In the example illustrated, the databases 290, 300, 310 are illustrated as being separate from the command server 110. For example, the databases 290, 300, 310 may be provided at a separate device and/or separate location. In some embodiments, the databases 290, 300, 310 are included within the memory 220 of the command server 110. In some embodiments, the databases 290, 300, 310 are decentralized such that the databases 290, 300, 310 are provided in each monitored area in, for example, a camera device or other device of the monitored area. The command server 110 stores information regarding each identified object of interest in the object of interest database 290. For example, each recognized object of interest may be given a unique identifier to track the object of interest across the plurality of cameras or zones of the monitored area. The unique identifier and corresponding image and characteristic data (for example, likenesses) of the object of interest are stored in the object of interest database 290. The command server 110 stores information regarding disappeared objects of interest in the disappearance database 300 as further described below. Disappeared objects of interests are, for example, objects of interest that are expected to be in a certain location but cannot be found anywhere in the monitored area. The command server 110 stores information regarding suspected objects of interest in the suspect database 310 as further described below. Suspected objects of interest are, for example, objects of interests that newly appeared and are suspected of being related to a previously disappeared object of interest.

In the example illustrated in FIG. 2, a single device is illustrated as including all the components and the applications of the command server 110. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the command server 110 are implemented in a cloud infrastructure accessible through several terminal devices, with the processing power located at a server location. In another example, the components and applications of the command server 110 may be divided between separate monitoring facility computing devices co-located at a monitored facility of the monitored area. In yet another example, the components and applications of the command server 110 may be divided between separate computing devices not co-located with each other but communicatively connected with each other over a suitable communication network.

Figure 3:
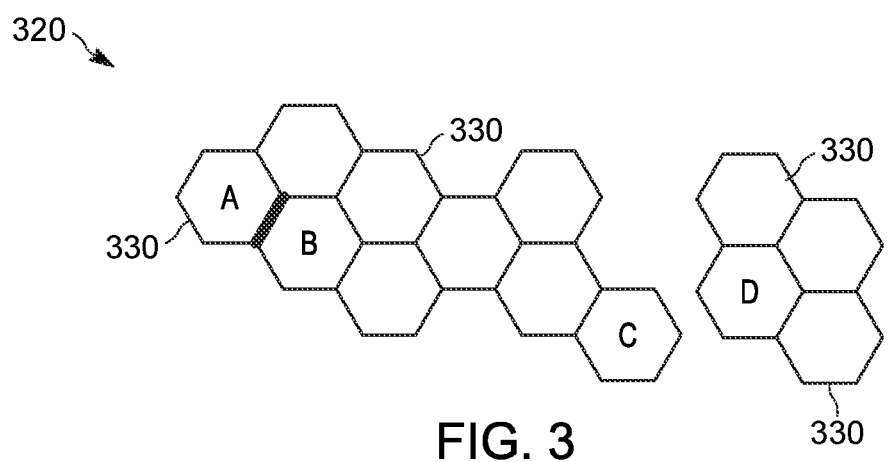
FIG. 3 illustrates a monitored area monitored by the monitoring system of FIG. 1 divided into a plurality of zones in accordance with some embodiments.

FIG. 3 illustrates an example of dividing a monitored area 320. The monitored area 320 is divided into a plurality of zones 330 each having a polygonal shape. In the example illustrated, the plurality of zones 330 have a honeycomb structure with the plurality of zones 330 having a hexagonal shape. In other examples, the plurality of zones 330 may have different shapes, for example, squares, pentagons, circles, and the like. Once the monitored area 320 is divided into the plurality of zones 330, the command server 110 assigns certain rules to the zones 330 based on the configuration of the zones 330. For example, when an object of interest is first observed in a first zone 330, the object of interest is next expected to be found in one of the zones 330 immediately adjacent to the first zone 330. That is, the object of interest is next expected to be found in one of the six or less zones 330 touching the first zone 330. When the object of interest is first observed in zone A 330, the object of interest is next expected to be found in, for example zone B 330.

In some embodiments, the rules assigned to the zones 330 include possible pathways between the zones 330. For example, it is possible for an object of interest first observed in zone A 330 to be observed in zone C 330 within a predetermined period of time. However, it may not be possible for the same object of interest to be observed in zone D 330 within the predetermined period of time since zone D 330 does not have a possible pathway from zone A 330 that can be covered by the object of interest within the predetermined period of time.

The plurality of image sensors 120 may be arranged at any location of the monitored area 320. For example, a first image sensor 120 can be arranged to monitor an area including zones A, B, and C 330 and a second image sensor 120 can be arranged to monitor an area including zone D 330. The image sensors 120 can also be placed in other arrangements. Each zone 330 may not be covered by a dedicated image sensor 120. A single image sensor 120 can cover multiple zones 330 or a single zone 330 may be covered by multiple image sensors 120.

Figure 4:
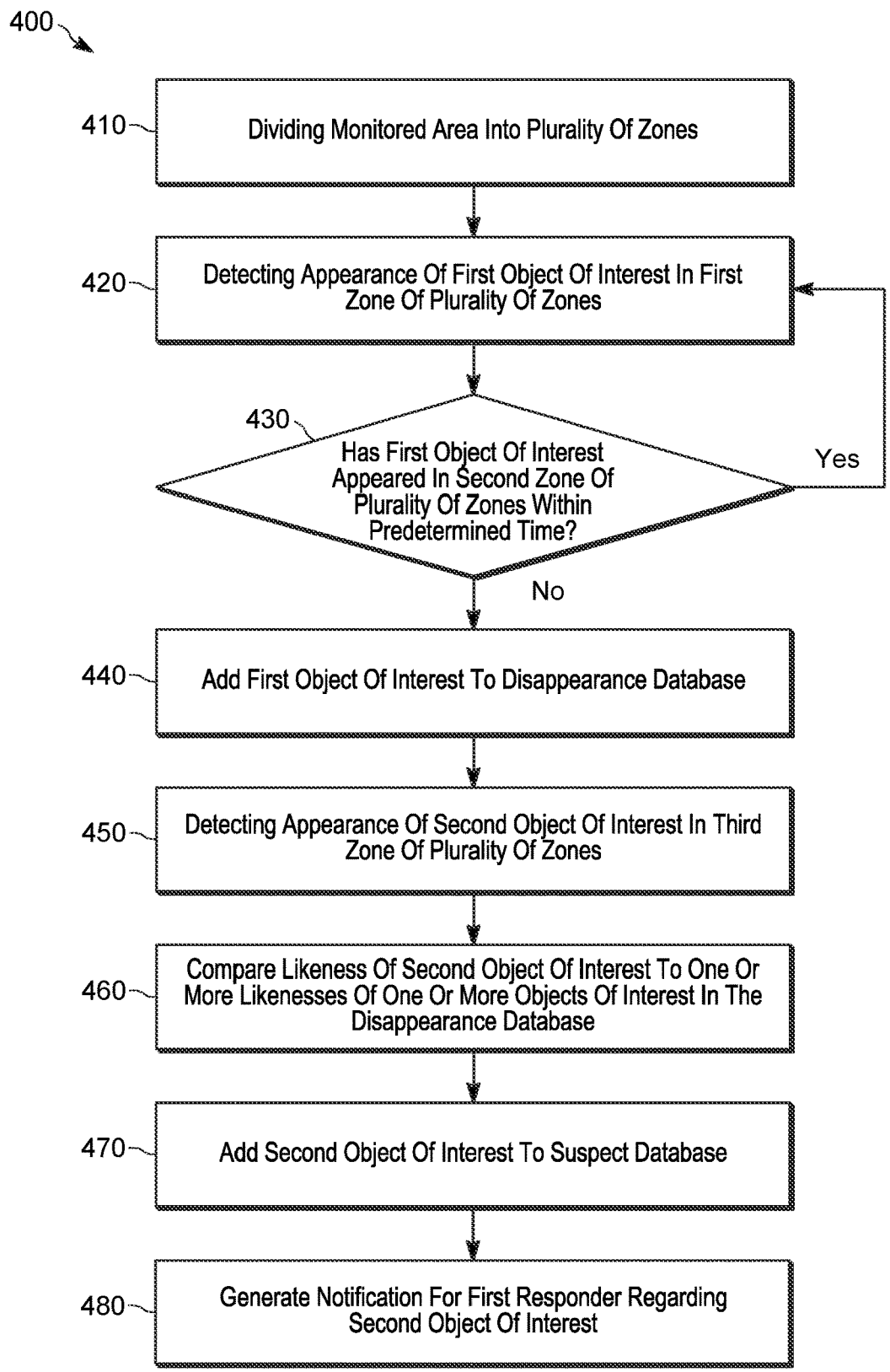
FIG. 4 is a flowchart of a method for identifying an object of interest after the object of interest has undergone a change in appearance in accordance with some embodiments.

FIG. 4 illustrates a flowchart of an example method 400 for identifying an object of interest after the object of interest has undergone a change in appearance. In the example illustrated in FIG. 4, the method 400 includes dividing, using the electronic processor 210 of the monitoring system 100, the monitored area 320 into a plurality of zones 330 (at block 410). As discussed above with respect to FIG. 3, the plurality of zones 330 may have various shapes and are not limited to the hexagonal shape shown. One or more image sensors 120 are used to monitor objects of interest in the plurality of zones 330. The electronic processor 210 assigns rules to the plurality of zones 330 based on the configuration of the plurality of zones 330.

The method 400 includes detecting, using the one or more image sensors 120 of the monitoring system 100, an appearance of a first object of interest in a first zone 330 of the plurality of zones 330 (at block 420). With reference to FIG. 3, the electronic processor 210 executes the appearance detection application 270 to detect that a new person has entered the monitored area 320 through a first entrance and into zone A 330. The zone A 330 corresponding to the first entrance is the first zone 330. The electronic processor 210 detects the new person using an image sensor 120 pointed at the first entrance or an image sensor 120 pointed at the first zone 330. The electronic processor 210 executes the video monitoring application 260 to perform facial recognition or image recognition to extract characteristics of the person and assign a unique identifier to the person. The characteristics and the unique identifier are then stored in the object of interest database 290.

The method 400 includes determining, using the electronic processor 210, whether the first object of interest has appeared in a second zone 330 of the plurality of zones 330 within a predetermined time (at block 430). The second zone 330 (for example, zone B 330) is adjacent the first zone 330. The electronic processor 210 continuously monitors the first object of interest to determine the next location of the first object of interest. Once a person enters a monitored area 320, the person moves between the plurality of zones 330 of the monitored area 320. When a person has left a first zone 330, the person is generally expected to be found in a zone 330 adjacent the first zone 330 within a predetermined time period. In the example illustrated in FIG. 3, when the person of interest leaves the first zone (for example, zone A 330), the electronic processor 210 determines whether the person of interest has appeared in the second zone 330 (for example, zone B 330) within a predetermined time. When the first object of interest has appeared in the second zone 330 within the predetermined time, the method 400 takes no action and returns to block 420.

In response to determining that the first object of interest has not appeared in the second zone 330 within the predetermined time, the method 400 includes adding the first object of interest to the disappearance database 300 (at block 440). The electronic processor 210 adds the characteristics, for example, that describe a likeness of the first object of interest and a unique identifier of the object of interest to the disappearance database 300.

The method 400 also includes detecting, using the one or more image sensors 120, an appearance of a second object of interest in a third zone 330 of the plurality of zones 330 (at block 450). Unexplained appearances of objects of interest in the monitored area 320 may need to be flagged for further investigation. An unexplained appearance occurs when, for example, the appearance of the second object of interest is not previously detected in the plurality of zones 330 and the third zone 330 is not an entry point of the monitored area. In another example, an unexplained appearance occurs when the appearance of the second object of interest is first detected in the third zone 330 after detecting the appearance of the second object of interest in a fourth zone 330 of the plurality of zones 330, where the fourth zone 330 is not adjacent the third zone 330. In the example illustrated in FIG. 3, the electronic processor 210 may detect an unexplained appearance of a second person of interest in the third zone 330 (for example zone C 330). As discussed above, the electronic processor 210 executes the video monitoring application 260 and uses facial recognition or image recognition techniques to extract characteristics (for example, likeness) of the second person of interest. The electronic processor 210 adds the characteristics and a unique identifier for the second person of interest to the object of interest database 290.

The electronic processor 210 compares a likeness of the second object of interest to one or more likenesses of one or more objects of interest in the disappearance database 300 (at block 460). In one example, the electronic processor 210 compares the likeness of the second object of interest to the likenesses of all the objects of interest stored in the disappearance database 300. The electronic processor 210 may execute the video monitoring application 260 to compare the likenesses. Facial recognition and image recognition techniques may be used to compare, for example, images of the second object of interest and the objects of interest in the disappearance database 300.

In response to determining that the likeness of the second object of interest does not match one of the one or more likenesses of one or more objects of interest in the disappearance database 300, the method 400 includes adding, using the electronic processor 210, the second object of interest to the suspect database 310 (at block 470) and generating, using the electronic processor 210, a notification for a first responder regarding the second object of interest (at block 480). The electronic processor 210 adds image captures of the second object of interest and a unique identifier associated with the second object of interest to the suspect database 310. The electronic processor 210 executes the notification application 280 to notify a first responder, for example, a portable communications device 130 of a first responder regarding the second object of interest. The notification may include a description and images of the second object of interest. The first responder may then take appropriate action based on the notification. Appropriate action may include, for example, approaching and questioning the second object of interest, or the like.

In some embodiments, in response to determining that the likeness of the second object of interest matches a likeness of the first object of interest in the disappearance database 300, the method 400 includes deleting, using the electronic processor 210, the first object of interest from the disappearance database 300. The electronic processor 210 may then relate the second object of interest to the first object of interest as described below.

In some embodiments, the electronic processor 210 takes further action with respect to objects of interest in the disappearance database 300. For example, the electronic processor 210 determines whether the first object of interest has reappeared in the plurality of zones 330 after a disappearance time and after being added to the disappearance database 300. When the electronic processor 210 determines that the first object of interest has not reappeared in the plurality of zones 330 after the disappearance time, the electronic processor 210 adds the first object of interest to the suspect database and generates a notification for the first responder regarding the first object of interest. The electronic processor 210 adds image captures of the first object of interest and a unique identifier associated with the first object of interest to the suspect database 310. The electronic processor 210 also notifies a first responder, for example, a portable communications device 130 of a first responder regarding the first object of interest. The notification may include a description and images of the first object of interest. The first responder may then take appropriate action based on the notification.

In some embodiments, the electronic processor 210 relates suspected objects of interests in the suspect database 310 to previously disappeared objects of interests in the disappearance database 300. For example, the electronic processor 210 relates the second object of interest to a third object of interest in the one or more object of interests of the disappearance database 300 based on an appearance time of the second object of interest in the third zone 330 and the time of disappearance of the third object of interest. For example, if a second object of interest appears in the same zone 330 or an adjacent zone 330 of the zone 330 where the third object of interest disappeared, the electronic processor 210 may relate the second object of interest to the third object of interest.

Figure 5:
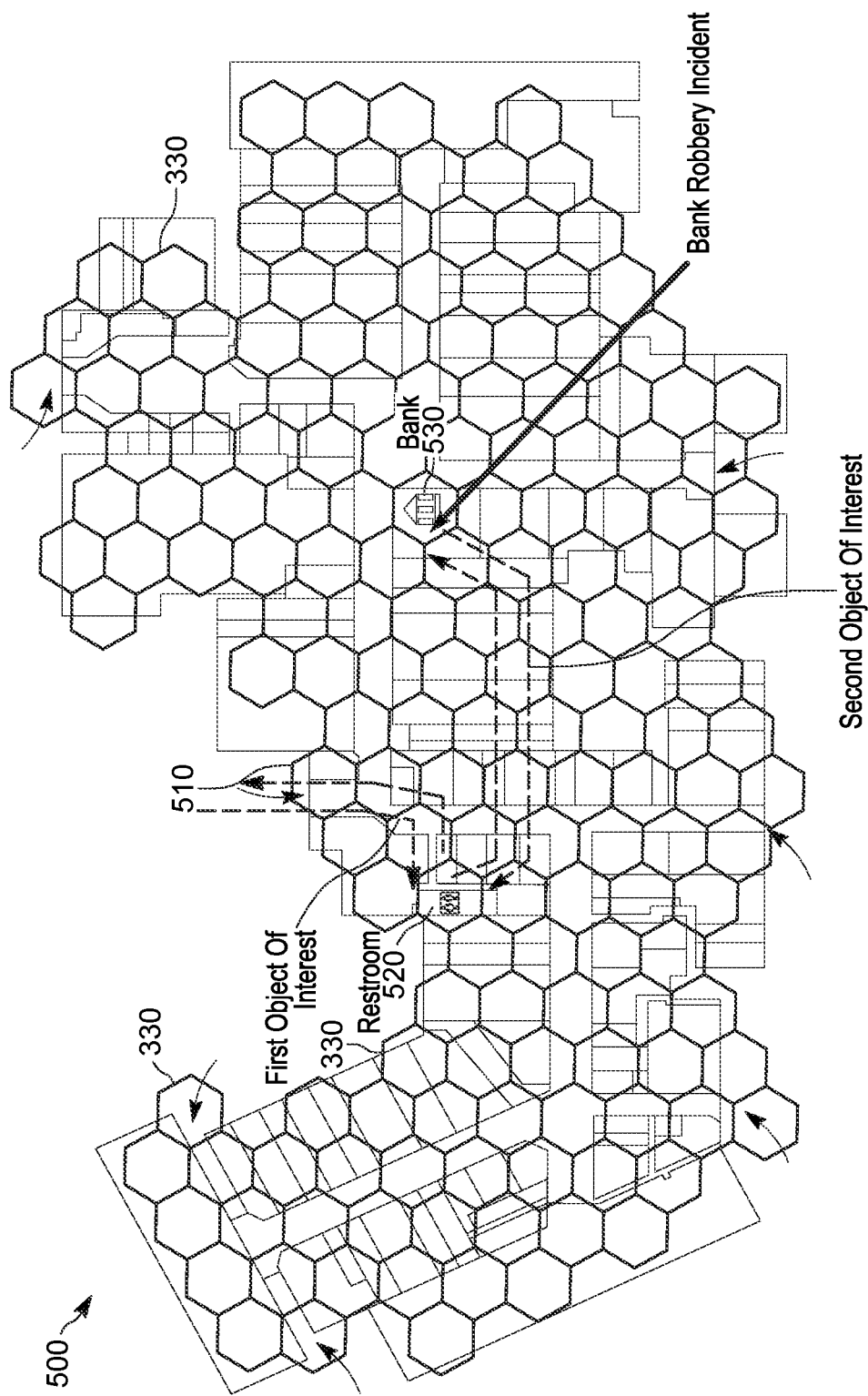
FIG. 5 illustrates an example use case of the method of FIG. 4 in accordance with some embodiments.

FIG. 5 illustrates a use case example of a bank robbery incident occurring in a shopping mall 500 for the method 400. The shopping mall 500 is the monitored area 320 and is divided into a plurality of zones 330. A person of interest enters the shopping mall 500 through a first entrance 510 and disappears in a restroom 520 of the shopping mall 500. The person of interest then puts on a disguise in the restroom and proceeds to the bank 530 to perform a bank robbery. After the robber, the person of interest moves back to the restroom 520 to remove the disguise and exit the shopping mall 500.

When the person of interest enters the shopping mall through the first entrance 510, the electronic processor 210 identifies the person of interest as a first object of interest detected in a first zone 330. The electronic processor 210 adds the first object of interest to the object of interest database 290 and tracks the first object of interest across the shopping mall 500. When the person of interest disappears in the restroom, the electronic processor 210 determines whether the person of interest reappears within a predetermined time. When the person of interest does not reappear within the predetermined time, the electronic processor 210 adds the first object of interest to the disappearance database 300.

The electronic processor 210 may also start a disappearance timer to track the amount of time the first object of interest has disappeared. The electronic processor 210 may further add the first object of interest to the suspect database 310 when the first object of interest does not appear in any one of the plurality of zones 330 within the disappearance time. The electronic processor 210 generates a notification to a first responder regarding the first object of interest.

When the person of interest then reappears using the disguise, the electronic processor 210 identifies the person of interest with the disguise as the second object of interest detected in a third zone 330. The electronic processor 210 adds the second object of interest to the object of interest database 290 and tracks the second object of interest across the shopping mall 500. The electronic processor 210 compares the likeness of the second object of interest to the likeness of the first object of interest in the disappearance database 300. The likenesses of the first object of interest and the second object of interest may not match due to the disguise. Since the appearance of the second object of interest is an unexplained appearance, that is, the third zone 330 is not an entrance to the shopping mall 500 and the second object of interest was not previously detected in the plurality of zones 330, the electronic processor 210 adds the second object of interest to the suspect database 310. The electronic processor 210 also generates a notification regarding the second object of interest to a first responder. The information regarding the second object of interest may then be used to stop the crime or as evidence in a subsequent investigation of the crime.

One advantage of the methods allows for early detection of crimes and apprehension of suspects before the suspects leave a crime scene.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A monitoring system for a monitored area comprising:
one or more image sensors for tracking objects of interest in the monitored area;
an electronic processor coupled to the one or more image sensors and configured to
divide the monitored area into a plurality of zones;
detect, using the one or more image sensors, an appearance of a first object of interest in a first zone of the plurality of zones
determine whether the first object of interest has appeared in a second zone of the plurality of zones within a predetermined time, wherein the second zone is adjacent the first zone;
in response to determining that the first object of interest has not appeared in the second zone within the predetermined time, add the first object of interest to a disappearance database;
detect, using the one or more image sensors, an appearance of a second object of interest in a third zone of the plurality of zones;

compare a likeness of the second object of interest to one or more likenesses of one or more objects of interest in the disappearance database; and in response to determining that the likeness of the second object of interest does not match one of the one or more likenesses of one or more objects of interest in the disappearance database add the second object of interest to a suspect database, and generate a notification for a first responder regarding the second object of interest.

2. The monitoring system of claim 1, wherein the appearance of the second object of interest is not previously detected in the plurality of zones and the third zone is not an entry point of the monitored area.

3. The monitoring system of claim 1, wherein the appearance of the second object of interest is first detected in the third zone after detecting the appearance of the second object of interest in a fourth zone of the plurality of zones, wherein the fourth zone is not adjacent the third zone.

4. The monitoring system of claim 1, wherein the electronic processor is further configured to in response to determining that the first object of interest has not reappeared in the plurality of zones after a disappearance time add the first object of interest to the suspect database, and generate a notification for the first responder regarding the first object of interest.

5. The monitoring system of claim 1, wherein each of the plurality of zones has a hexagonal shape.

6. The monitoring system of claim 1, wherein the electronic processor is further configured to relate the second object of interest to a third object of interest in the one or more objects of interest based on an appearance time of the second object of interest in the third zone and a time of disappearance of the third object of interest.

7. The monitoring system of claim 1, wherein the electronic processor is further configured to in response to determining that the likeness of the second object of interest matches a likeness of the first object of interest in the disappearance database delete the first object of interest from the disappearance database.

8. A method of identifying an object of interest after the object of interest has undergone a change in appearance, the method comprising:

dividing, using an electronic processor of a monitoring system, a monitored area into a plurality of zones;

detecting, using one or more image sensors of the monitoring system, an appearance of a first object of interest in a first zone of the plurality of zones determining, using the electronic processor, whether the first object of interest has appeared in a second zone of the plurality of zones within a predetermined time, wherein the second zone is adjacent the first zone;

in response to determining that the first object of interest has not appeared in the second zone within the predetermined time, adding the first object of interest to a disappearance database;

detecting, using the one or more image sensors of the monitoring system, an appearance of a second object of interest in a third zone of the plurality of zones;

comparing, using the electronic processor, a likeness of the second object of interest to one or more likenesses of one or more objects of interest in the disappearance database; and in response to determining that the likeness of the second object of interest does not match one of the one or more likenesses of one or more objects of interest in the disappearance database adding, using the electronic processor, the second object of interest to a suspect database, and generating, using the electronic processor, a notification for a first responder regarding the second object of interest.

9. The method of claim 8, wherein the appearance of the second object of interest is not previously detected in the plurality of zones and the third zone is not an entry point of the monitored area.

10. The method of claim 8, wherein the appearance of the second object of interest is first detected in the third zone after detecting the appearance of the second object of interest in a fourth zone of the plurality of zones, wherein the fourth zone is not adjacent the third zone.

11. The method of claim 8, further comprising:

in response to determining that the first object of interest has not reappeared in the plurality of zones after a disappearance time adding, using the electronic processor, the first object of interest to the suspect database, and generating, using the electronic processor, a notification for the first responder regarding the first object of interest.

12. The method of claim 8, wherein each of the plurality of zones has a hexagonal shape.

13. The method of claim 8, further comprising:

relating the second object of interest to a third object of interest in the one or more objects of interest based on an appearance time of the second object of interest in the third zone and time of disappearance of the third object of interest.

14. The method of claim 8, further comprising:

in response to determining that the likeness of the second object of interest matches a likeness of the first object of interest in the disappearance database deleting, using the electronic processor, the first object of interest from the disappearance database.

* * * * *